United States Patent [19]

Lee et al.

[11] Patent Number: 5,454,022
[45] Date of Patent: Sep. 26, 1995

[54] METHOD OF TAKING X-RAY IMAGES WITH A CCD IMAGE SENSOR, AND A CCD IMAGE SENSOR SYSTEM

[75] Inventors: Teh-Hsuang Lee, Webster; William J. Toohey, Shortsville, both of N.Y.

[73] Assignee: Eastman Kodak Company, Rochester, N.Y.

[21] Appl. No.: 38,208

[22] Filed: Mar. 26, 1993

[51] Int. Cl.$^6$ .................................................. H05G 1/64
[52] U.S. Cl. ........................................ 378/98.8; 378/98.2
[58] Field of Search ..................................... 378/98.8, 98.2

[56] References Cited

U.S. PATENT DOCUMENTS

| | | | |
|---|---|---|---|
| 4,652,926 | 3/1987 | Withers et al. | 358/213 |
| 4,796,183 | 1/1989 | Ermert et al. | 378/19 |
| 4,891,829 | 1/1990 | Deckman et al. | 378/19 |
| 4,982,415 | 1/1991 | Shibata et al. | 378/19 |

OTHER PUBLICATIONS

Philips Medical Systems, sales publication, "Visualaix The New Way to Take Dental X-rays".

*Primary Examiner*—Craig E. Church
*Attorney, Agent, or Firm*—James D. Leimbach

[57] ABSTRACT

An image sensor, which is useful with a base image system, for use in taking an X-ray image of an object, includes a charge coupled device which has capacitors, which when charged by the base system, hold a voltage for a useful period of time which maintains the charge coupled device in a mode in which an X-ray generated image can be recorded therein when the charge coupled device is not directly electrically connected to the base image system. The charge coupled device is encapsulated in a material which is opaque to light but is transparent to X-rays. The image sensor has electrical contacts which are used to connect it to the base image system before and after but not during a time an X-ray image of an object is being recorded by the charge coupled device. A method of taking a dental X-ray involves placing the charge coupled device image sensor in direct electrical contact with a base image system to set the image sensor to a mode in which an image can be recorded therein. The charge coupled device is then removed from the base image system and is then placed in the mouth of a person at one side of teeth to be X-rayed. X-rays are then directed into the mouth of the person, through the teeth, and onto the charge coupled device image sensor to generate in the charge coupled device image sensor an electronic image of the teeth. The image sensor is then removed from the mouth of the person and placed back into direct electrical contact with the base image system. An output signal from the base image sensor is connected to a display unit so as to provide a visual image of the object.

19 Claims, 2 Drawing Sheets

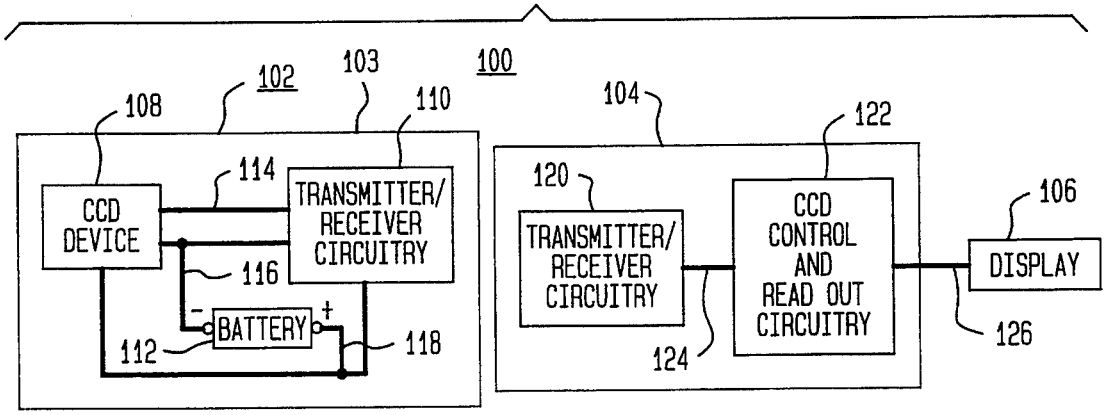
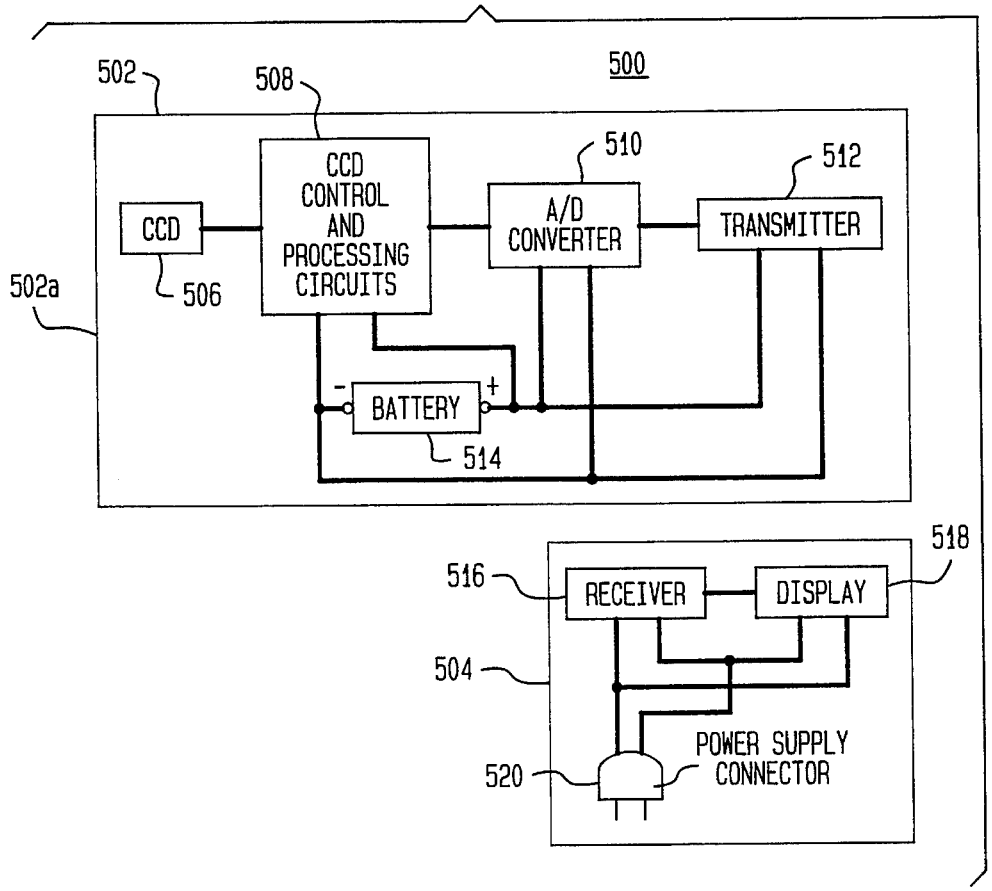

METHOD OF TAKING X-RAY IMAGES WITH A CCD IMAGE SENSOR, AND A CCD IMAGE SENSOR SYSTEM

FIELD OF THE INVENTION

The present invention is directed to a CCD image sensor system for use in taking X-ray images and to a method of taking an X-ray image, and, more particularly, to a method of taking dental X-ray images with a charge coupled device (CCD) image sensor which forms part of a CCD image sensor system.

BACKGROUND OF THE INVENTION

Heretofore, X-ray images were taken using a film which is responsive to X-rays, and then developing the film. This technique has a number of problems. The X-ray film must be stored and handled under conditions where it is not subjected to light. Also, it requires a period of time after the image is taken to develop the film. Since it cannot be determined whether a satisfactory image has been taken until after the film is developed, this often causes a delay for the parties involved, particularly if the X-ray picture is of a person. Also, the image is read as a negative of the film and not a positive. Therefore, it is difficult to obtain additional copies of the X-ray image. In addition, an X-ray film can be used only once. This adds to the cost of taking X-ray image and requires the maintenance of a large supply of X-ray films. In addition, it is difficult to digitize and/or transmit a film X-ray.

Some dental X-ray sensor systems advertised use a charge coupled device (CCD) as a sensing element. An example of such a system is the "VISUALIX" system by Philips Medical Systems of Philips. The CCD is typically encapsulated in an opaque housing and electrical wires connect the CCD to a base station which is typically powered by 110 or 220 volts a.c. In operation, the housed CCD is placed in the mouth of a person next to a tooth which is to be X-rayed. The base station contains control circuitry and readout circuitry for powering up the CCD and then for reading out an image formed in the CCD by an X-ray passing through teeth. The creation of an electronic image facilitates its being digitized and transmitted such that it can be read at a remote location from where it was generated. In order to avoid causing an electrical shock to the person whose X-ray is being taken, it is required to provide electrical isolation between line voltage powering the base station and the CCD. It is also required to have voltage overload protection provided in the base station in case of a voltage or current spike in the a.c. power source. The CCD sensor and the wires attached thereto have to be sterilized after each use to limit the spread of infection. This is difficult to do because the wires are connected at both ends and must be disconnected or the entire base station, wires, and CCD sensor must all be sterilized. Another problem is that it is an annoyance to the person whose X-rays are being taken to have wires extending from his or her mouth.

It is desirable to have a dental X-ray system which uses a CCD sensor that can be placed in a persons mouth without the need for it being connected by electrical wires to a base station during the taking of an X-ray.

SUMMARY OF THE INVENTION

The present invention is directed to a method and apparatus for generating electronic images generated by X-rays passing through an object. The apparatus in one aspect of the present invention is an image system comprising a base image system and an image sensor. The image sensor typically comprises a CCD image sensor that is adapted to be set in a mode in which an X-ray generated image of an object can be recorded therein. While the image sensor is physically and electrically isolated from the base image system, it is maintained in the mode in which an X-ray image of an object can be recorded therein for a useful period of time. After an electronic image of the object is recorded in the CCD image sensing device, the image sensor is electrically coupled to the base image system so as to send the electronic image of the object to the base image system from which it can be read out. Typically the base image system comprises a display which provides a visual picture of the electronic image of the object. One preferred application for the image system is for taking X-rays of a person's teeth. The image sensor is typically small enough to fit in the mouth of a person and has no wires which extend therefrom.

Viewed from one aspect, the present invention is directed to a method of taking an X-ray image of an object. The method comprises a first step of setting an image sensing device in a mode in which an image of an object can be recorded therein. In a second step the image sensing device is physically and electrically isolated from a base image system after the image sensing device is set to the mode in which an image can be recorded therein. In a third step the image sensor is maintained in the mode previously set in for a useful period of time while the image sensor is physically and electrically isolated from the base image system. In a fourth step the image sensing device is placed near an object which it is desired to have an X-ray generated electronic image thereof. In a fifth step X-rays are directed through the object and onto the image sensing device to generate an electronic image of the object in the image sensing device. In a sixth step the image sensor and the base image system are electrically coupled after the electronic image of the object has been generated in the image sensing device so as to transfer the electronic image of the object from the image sensing device to the base image system.

Viewed from an other aspect, the present invention is directed to an image system. The image system comprises a base image system and an image sensor. The image sensor comprises an image sensing device, encapsulating means for encapsulating the image sensing device, setting means, maintaining means, and electrically coupling means. The encapsulating means is opaque to light but transparent to X-rays. The setting means sets the image sensing device in a mode in which an X-ray generated image of an object can be recorded therein. The maintaining means maintains the image sensor in the mode in which an X-ray generated image of an object can be recorded therein for a useful period of time with the image sensing device physically and electrically isolated from the base image system. The electrically coupling means electrically couples the image sensing device to the base image system after an X-ray generated electronic image of an object has been recorded by the image sensing device so as to transfer the electronic image of the object to the base image system.

Viewed from still another aspect, the present invention is directed to an image sensor, which is useful with a base image system, for use in taking an X-ray image of an object. The image sensor comprises an image sensing device, encapsulating means for encapsulating the image sensing device, setting means, maintaining means, and electrically coupling means. The encapsulating means is opaque to light but transparent to X-rays. The setting means sets the image sensing device in a mode in which an X-ray generated image of an object can be recorded therein. The maintaining means maintains the image sensor in the mode in which an X-ray generated image of an object can be recorded therein for a useful period of time with the image sensing device physically and electrically isolated from the base image system. The electrical coupling means electrically couples the image sensing device to the base image system after an X-ray generated electronic image of an object has been recorded by the image sensing device so as to transfer the electronic image of the object to the base image system.

The invention will be better understood from the following more detailed description taken with the accompanying claims and drawings.

BRIEF DESCRIPTION OF THE DRAWINGS

FIG. 4 is a schematic view in block diagram form of an image system in accordance with the present invention; and FIG. 5 is a schematic view in block diagram form of an other image system in accordance with the present invention.

The drawings are not necessarily to scale.

DETAILED DESCRIPTION

Figure 1:
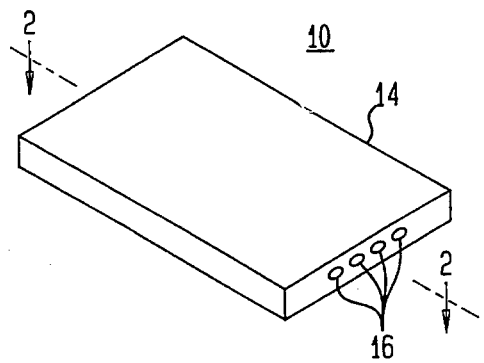
FIG. 1 is a perspective view of an image sensor adapted to receive and record an X-ray image of an object in accordance with the present invention.
Figure 2:
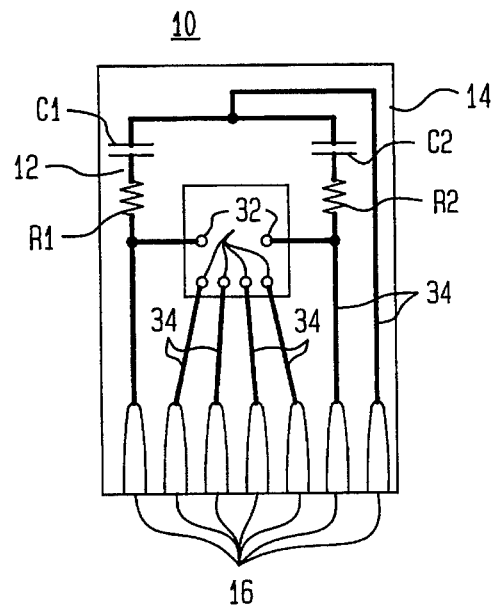
FIG. 2 is a sectional view taken along dashed line 2—2 of FIG. 1 with a schematic of some electrical components of the image sensor of FIG. 1.

Referring now to FIGS. 1 and 2, there are shown a perspective view (FIG. 1) and a sectional view (FIG. 2—which shows a schematic of electric components) along a dashed line 2—2 of FIG. 1 of an image sensor 10 in accordance with the present invention. Image sensor 10 comprises a charge-coupled device 12 (see FIG. 2) enclosed in a housing 14, capacitors C1 and C2, and resistors R1 and R2, and terminal sockets 16. Typically CCD device 12 is a two phase CCD device. Terminal sockets 16 are in the housing 14 and are exposed at one edge of the housing 14. A first terminal of resistor R1 is coupled via a separate wire 34 to a separate one of socket terminals 16 and to a terminal 32 of CCD device 12. A first terminal of resistor R2 is coupled via a wire 34 to a separate one of socket terminals 16 and to a terminal 32 of CCD device 12. A second terminal of resistor R1 is coupled to a first terminal of capacitor C1. A second terminal of resistor R2 coupled to a first terminal of capacitor C2. Second terminals of C1 and C2 are coupled through a wire 34 to a separate socket terminal 16 which is typically held at a reference potential which is also applied to a substrate of the CCD device 12. C1 and C2 serve to hold the voltage level of signals applied thereto at a useful level for a useful period of time as will be explained hereinbelow. R1 and R2 serve to limit current flow. Typical values of C1 and C2 are 0.1 microfards each and typical values of R1 and R2 are 1,000 ohms each. Although only seven terminal sockets 16 are shown, the image sensor 10 will have a number of terminal sockets 16 depending on the number of output terminals of the charge-coupled device 12. Typically there are about nine or more terminal sockets 16. The housing 14 is of a material which is opaque to light, but is transparent to x-rays. One suitable material is a ceramic which can be formed into a two piece housing 14 having a cavity therein for receiving the charge-coupled device 12. However, for use in taking dental X-rays, the housing 14 is selected to be of a material which allows housing 14 to be compact enough to allow the image sensor 10 to be placed in a person's mouth. Also, the housing must be of a material which will not dissolve in saliva and which is not toxic. In addition, the material should be capable of being heat treated to permit cleaning (sterilizing) of the housing 14 of the image sensor 10 between uses thereof. There are a number of plastics which meet these qualifications and which can be molded around the charge-coupled device 12 to form a small package.

Figure 3:
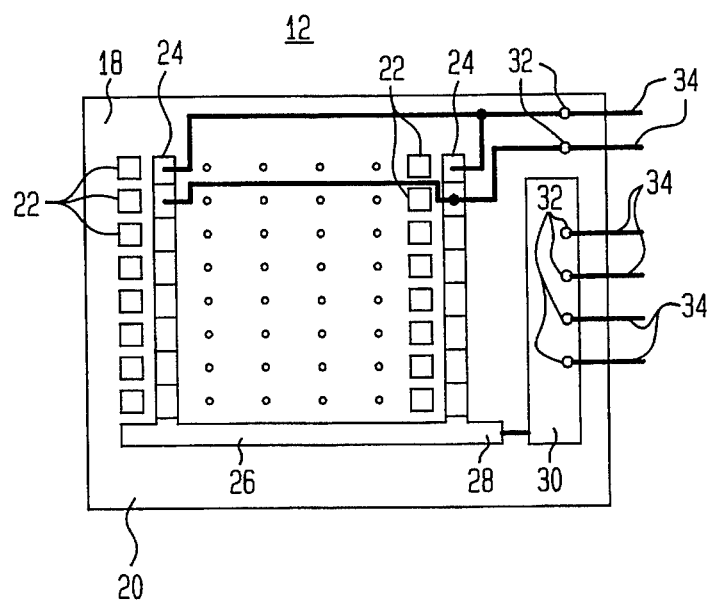
FIG. 3 is a top plan schematic view of a charge-coupled device (CCD) which can be used in the image sensor shown in FIG. 1.

Referring now to FIG. 3, there is shown a top plan schematic view of a charge-coupled device 12 which can be used in the image sensor 10. Charge-coupled device 12 comprises a body 18 of a semiconductor material, such as single crystalline silicon, having a surface 20. A plurality of photodetectors 22, such as photodiodes or photocapacitors, are in the body 18 at the surface 20. The photodetectors 22 are arranged in an array of a plurality of rows and columns. For clarity, only two rows of the photodetectors 22 are shown. A vertical CCD shift register 24 is in the body 12 at the surface 14 along each row of photodetectors 22. Each vertical shift register comprises a plurality of even and odd segments. Although not shown, each vertical CCD shift register 24 comprises a channel region within the body 12 and extending to the surface 14. The channel region extends substantially parallel to but spaced from the adjacent row of photodetectors 22. A plurality of conductive gate electrodes (not shown) extend across the channel region and are electrically insulated from the surface 14, such as by a layer of silicon dioxide. There is at least one gate electrode adjacent each of the photodetectors 22. A transfer gate (not shown) extends between the row of photodetectors 22 and the channel region to allow charge carriers photogenerated in the photodetectors 22 to be transferred from the photodetectors 22 to the channel region of the vertical CCD shift register 24. Whereas the CCD device 12 is shown as an interline device, in a preferred embodiment it is a full frame CCD such as is described in U.S. Pat. No. 5,115,458.

A horizontal CCD shift register 26 is in the body 12 at the surface 14. The horizontal CCD shift register 26 extends across each one of each of the vertical CCD shift registers 24 and is electrically connected thereto. Although not shown, the horizontal CCD shift register 26 is of a construction similar to the vertical CCD shift registers 24. The horizontal CCD shift register 26 comprises a channel region (not shown) in the body 12 and extending to the surface 14. The channel region of the horizontal CCD shift register 26 extends across one end of the channel region of each of the vertical CCD shift registers 24. A plurality of conductive gate electrodes (not shown) extend across the channel region and are electrically insulated from the surface 20, such as by a layer of silicon dioxide. There is at least one gate electrode positioned adjacent the end of each of the vertical CCD shift registers 24. Transfer means is provided between the ends of the vertical CCD shift registers 24 and the horizontal CCD shift register 26 to transfer the charge carriers from the channel regions of the vertical CCD shift register 24 to the channel region of the horizontal CCD shift register 26.

An output end 28 of the horizontal CCD shift register 26 is electrically coupled to an output signal processing circuit 30 which is shown as in block form as a rectangular 30. Although the details of the output signal processing circuit 30 are not shown, it can be of any construction well known in the art. Output signal processing circuit 30 has a plurality of output terminals 32, each of which is electrically coupled to a separate one of the terminal sockets 16 by a separate wire 34. CCD device 12 is shown with two other terminals 32 with the first being coupled to first segments of each of the vertical shift registers 24 and with the second being coupled to second segments of each of the vertical shift registers 24. The first of the two additional terminals 32 is also coupled to each of the other odd segments (e.g., 3rd, 5th, 7th, etc.) of all of the vertical shift registers 24. The second of the two additional terminals 32 is also coupled to each of the other even segments of the shift registers 24.

In the operation of the image sensor 10, to take an X-ray, the image sensor 10 is plugged into a base image system (not shown). The base image system includes circuits for continuously clocking the charge-coupled device 12 so as to flush the charge-coupled device 12 of charge carriers and can be a variety of well know base image systems. The base image system also includes means for reading the output signal from the signal processing circuit 30 and displaying the signal as a picture. The display may be a CRT monitor and/or a suitable printer. When an X-ray is to be taken, the image sensor 10 is unplugged from the base image system and placed behind an object to be X-rayed. Capacitors C1 and C2 serve to hold voltage applied thereto while CCD device 12 is plugged into the base image system for a period of time that is long enough to keep it in the accumulation mode such that an X-ray picture can be taken and the CCD device can be returned to the base image system for readout before the picture taken degrades to a point at which it is not useful.

For a dental X-ray, the image sensor 10 is placed in the patients mouth behind the teeth to be X-rayed. X-rays are then directed through the object onto the image sensor 10. The X-rays pass through the housing 14 and into the photodetectors 22 where charge carriers are photogenerated. The image sensor 10 is then plugged back into the base image system which clocks the charge-coupled device 12 and obtains an output signal corresponding to the X-ray picture taken. This output signal is displayed by the base image system to provide an X-ray picture.

It has been found that the X-ray image is stored in the charge-coupled device 12 and remains in usable condition for about one minute or longer. Thus, once the image sensor 10 is exposed to the X-ray, it should be quickly returned to the base image system to be read out. For this purpose, the base image system may be provided with a timer connected to the plug for the image sensor 10 through a switch. Thus, when the image sensor 10 is removed from the plug, the switch turns on the timer. If the image sensor 10 is returned to the plug within the appropriate time, the image sensor will read out and display the picture taken by the image sensor 10. However, if the image sensor 10 is not returned in time, the timer will provide a warning that the image is not valid.

It is preferable that the charge-coupled device 12 be of the type that operates in an "accumulation mode". The "accumulation mode" is a mode of operation where holes are accumulated at the silicon/silicon dioxide interface. This greatly reduces the dark current generated in the charge-coupled device 12. A charge-coupled device which operates in the "accumulation mode" is described in greater detail in commonly-assigned U.S. Pat. No. 5,115,548 (Bruce Burkey et al.), issued May 19, 1992, entitled "Reduced Dark Current in Charge Coupled Devices". A charge-coupled device operating in the "accumulation mode" produces so little dark current that it can be unclocked for more than a full minute and still produce a good quality image.

To increase the quality of the resulting image, the base image system is typically provided with means for reading out and storing a dark image (i.e., an image in which there has been no exposure to X-rays, light, or other electromagnetic energy which can result in an image being generated in the CCD device 12) of the charge-coupled device 12. The dark image is preferably generated during a period of time approximately equal to the time required to remove image sensor 10 from the base image system, expose it to an X-ray, and return it to the base image system. This helps insure that the amount of charge found in the CCD device 12 due to "dark current" is essentially the same as occurs during the time the image sensor 10 is removed from the image system. After the X-ray image is read out by the base image system, the dark image is subtracted from the X-ray image. This produces an image relatively free of defects.

Referring now to FIG. 4, there is shown an image system 100 in accordance with the present invention. System 100 comprises an image sensor unit 102, a base image system 104, and a display 106. Image sensor unit 102 is electrically and physically air isolated from base image system 104. Image sensor 102 comprises a housing 103 within which are a charge coupled device (CCD) 108, transmitter/receiver circuitry (wireless means) 110, and a battery 112. Base image system 104 comprises CCD control and read out circuitry 122 and transmitter/receiver circuitry (wireless means) 120. System 100 works in a very similar manner to image sensor 10 of FIG. 1 and the base image system (not shown) used therewith except that all electrical couplings between image sensor unit 102 and base image system 104 are done through the air and not through electrical conductors.

Housing 103 is opaque to light but transparent to X-rays. CCD device 108 is coupled to transmitter/receiver circuitry 110 by a conductor 114 which is symbolic for a plurality of conductors. Negative (−) and positive (+) terminals of battery 112 are coupled to CCD device 108 and transmitter/receiver circuitry 110 to power same via conductors 116 and 118, respectively.

Transmitter/receiver circuitry 120 is coupled to CCD control and read out circuitry 112 by a conductor 124 which is symbolic for a plurality of conductors. An output of CCD control and read out circuitry 122 is coupled to display 106 by a conductor 126 which is symbolic for a plurality of conductors.

In operation, the CCD control and read out circuitry 122 provides clocking signals via conductor 124 to circuitry 120. These clocking signals are broadcast through the air between circuitry 120 and image sensor 102 and are received by circuitry 110 and then sent via conductor 114 to CCD device 108 so as to flush CCD 108 of charge carriers. All signals between circuitries 110 and 120 are then stopped so as to electrically isolate image sensor 102 from base image system 104. Image sensor 102 is then placed behind an object which is to be X-rayed. X-rays are then directed through the object and the housing 103 onto the CCD device 108 of the image sensor 102 where charge carriers are generated which represent an electronic image of the object. The electronic image stored in CCD device 108 is sent via conductor 114 to circuitry 110 for transmission to circuitry 120 via the air. The signals received by circuitry 120 are sent via conductor 124 to circuitry 122. Circuitry 122 reads the image information received and sends same via conductor 126 to display 106. Display 106 provides a visual picture of the X-ray image of the object.

Referring now to FIG. 5, there is shown an image system 500 in accordance with the present invention. System 500 comprises an image sensor unit 502 and a base image system 504. Image sensor unit 502 comprises a charge coupled device (CCD) 506 for recording an X-ray image of an object, CCD control and processing circuits 508, an analog-to-digital converter (A/D) 510, a transmitter 512, and a battery 514. Base image system 504 comprises a receiver 516, a display 518, and a power supply connector (plug) 520.

In a preferred embodiment of imaging system 500 useful for taking X-rays of human teeth, image sensor unit 502 is small enough to fit in a persons mouth. An outer covering 502a of image sensor unit 502 is opaque to light but transparent to X-rays. CCD 506 is coupled via a conductor(s) to CCD control and processing circuits 508 which are coupled via a conductor(s) to A/D converter 510 which is coupled via a conductor(s) to transmitter 512. The battery 514 is coupled via a positive (+) terminal and a negative (−) terminal to CCD control and processing circuits 508, A/D converter 510, and transmitter 512. Battery 514 typically has relatively low output voltage (e.g., in the range of several volts to about 20 volts). Receiver 516 is coupled via a conductor(s) to display 518 with both being coupled to the power supply connector (plug) 520 which is typically inserted into an a.c. outlet (not shown) of 110 or 220 volts a.c. Transmitter 512 and receiver 516 can be of a variety of different types such as radio frequency (RF) or infrared. Base image system 504 and image sensor unit 502 are electrically isolated from each other by air therebetween.

In operation, the base image system 504 is left in a standby mode of operation and the CCD 506 is initiated by scanning signals receiving from the CCD control and processing circuits 508 into an integrating mode by first clearing residual charge therefrom. This is typically achieved by pushing a power-up button (not shown) on the image sensor 502. The image sensor is then placed by a technician in the mouth of a person behind teeth that are to be X-rayed. A time delay is typically built into the image sensor 502 to allow the technician to leave the area before X-rays are emitted. After the delay time, scanning of the CCD 506 is stopped and a fixed voltage is applied to control electrodes (not shown) of the CCD 504 by CCD control and processing circuits 508. X-rays are then emitted from a source (not shown) thereof and form an electronic image in the CCD 506.

At the end of the X-ray emission, the CCD control and processing circuits start to send clock pulses to the CCD 506 to scan the image stored therein. The end of the X-ray emission (exposure) can be determined by either a predetermined time interval, sensing circuitry (not shown) built into the image sensor 506, or by having the transmitter 512 be a transceiver and the receiver 516 being a transceiver which sends a signal to the transceiver of the image sensor 502 that corresponds to an end of X-ray emission and to the beginning of a read out operation of the image stored in CCD 506. The image stored in CCD 506 is scanned (read out) as a stream of analog signal pulses to the CCD control and processing circuitries 508. Each sensed signal is then amplified and processed by circuits 508 and then sent to A/D converter 510 where the analog signals are converted to digital form. The digital form of the image is then sent to transmitter 512 and then is transmitted through the air between image sensor 502 and base image system 504 to receiver 516. Receiver 516 receives the digital form of the image and via a conductor(s) transfers same to display 518 which provides a visual display of the image of the teeth.

In a preferred embodiment CCD 506, circuitries 508, A/D converter 510, and transmitter 512 would be fabricated on a single integrated circuit chip. Typically CMOS technology would be used in order to provide low power dissipation so as to limit battery drain and thus extend battery life.

It is to be appreciated and understood that the specific embodiments of the invention are merely illustrative of the general principles of the invention. Various modifications may be made consistent with the principles set forth. For example, other structures of the charge-coupled device 12 can be used as long as it is capable of being operated in the "accumulation mode". Still further, the image sensor 10, instead of having a female terminals 16 (as shown) can have male terminals which plug into female terminals in the base image system. Still further, the female terminals 16 can be replaced by electrically conductive terminals formed on a surface of housing 14 and essentially flush therewith. Furthermore, the housing 14 can be of any material which is opaque to light but is transparent to X-rays. Still further, the transmitter/receiver circuitries of FIG. 4 can each comprise light emitting diodes and light sensitive diodes which can sent light signals through the air or through optical fibers. These optical fibers can be placed in contract with the image sensor 102 or can be placed close thereto so as facilitate an exchange of signals between the transmitter/receiver circuitries. Still further, a number of different CCD's other than the one shown in detail can be substituted for the one shown and can be operated in other than the accumulation mode. Furthermore, image sensors such as an MOS diode array, charge modulation devices, and charge injection devices can be substituted for the CCD. Still further, capacitors C1 and C2 of FIG. 2 can be replaced by a battery.

What is claimed is:

1. A method of taking an X-ray image of an object comprising the steps of:

configuring an X-ray image recording system having a base image system that can interrogate an image sensor, the image sensor having an image sensing device that can be placed into a record mode to record electronic images under control of the base system and interrogated by the base image system;

setting the image sensing device in the record mode in which an image of an object can be recorded therein;

physically and electrically isolating the image sensing device from the base image system after the image sensing device is set into the record mode;

maintaining the image sensing device in the record mode previously set for a predetermined period of time while the image sensor is physically and electrically isolated from the base image system;

placing the image sensor in a position such that the image sensing device is near an object which is desired to be electronically imaged;

directing X-rays through the object and onto the image sensor such that an electronic image is formed within the image sensing device; and coupling the image sensor and the base image system after the electronic image of the object has been generated in the image sensing device so as to enable transfer of the electronic image of the object from the image sensing device to the base image system.

2. The method of claim 1 further comprising the step of reading out an output signal from the base image sensor which corresponds to the image of the object.

3. The method of claim 1 further comprising the steps of:

configuring the X-ray recording system having a wireless transmitter/receiver system contained on both the base image system and the image sensor that enables control of the image sensing device by and communication with the base image system;

generating an output signal from the image sensing device while there is no exposure to X-rays or light for a period which is essentially equal to a period of time in which the image sensing device was exposed to X-rays;

establishing via the wireless transmitter/receiver system the electrical coupling between the image sensor and the base image system to enable transfer to the base image system of the electronic image stored in the imaging sensing device with no exposure to X-rays or light to the base image system;

subtracting the output signal generated by the image sensing device when not exposed to X-rays or light from the output signal generated when the image sensing device was subject to X-ray exposure so as to generate an image of the object; and reading out an output signal from the base image sensor which corresponds to the image of the object.

4. The method of claim 1 wherein the electrical coupling step is achieved by a wireless transmission from a transmitter of the image sensing device to a receiver of the base image system.

5. The method of claim 1 wherein the setting to and maintaining step is achieved by a wireless transmission from a transmitter of the base image system to a receiver of the image sensing device, and the electrically coupling step is achieved by a wireless transmission of a transmitter of the image sensing device to a receiver of the base image system.

6. The method of claim 1 wherein the setting step and the electrically coupling step are both achieved by making physical and electrical contact between the image sensing device and the base image system.

7. A method of creating an X-ray image of an object on an image sensor so that it can be retrieved by a base system capable of interrogating the image sensor comprising the steps of:

electrically coupling the image sensor, which comprises; 1. means for selectively setting an image sensing device thereof in a recording mode in which an image of an object can be recorded therein, and 2. first wireless means for transmitting signals representative of the image recorded within the image sensing device to the base image system that comprises; second wireless means for receiving signals from the image sensing device and, interrogation means for reading the image that has been stored in the image sensor;

setting the image sensing device to the mode in which an image of an object can be recorded therein;

physically and electrically isolating the image sensor from the base image system after the image sensing device has been set in the mode in which an image can be recorded therein;

maintaining the image sensing device in the mode previously set in for a useful period of time while the image sensor is physically and electrically isolated from the base image system;

placing the image sensor such that the image sensing device is near an object which is desired to take an X-ray image of;

directing X-rays through the object and onto the image sensing device to generate an electronic image of the object in the image sensing device;

establishing via the first and second wireless means an electrical coupling between the image sensing device and the base image system so as to enable transfer of the electronic image of the object from the image sensor to the base image system; and reading out an output signal from the image sensing device which corresponds to the image of the object.

8. A method of creating X-ray images of objects comprising the steps of:

configuring an X-ray system having a base image system electrically coupled to a charge coupled device image sensor capable of storing data representative of objects in electronic form, the charge coupled device comprising 1. means for selectively setting the charge coupled device in a record mode for recording an image of an object therein, and 2. wireless means for selectively transmitting signals to and receiving signals from the base image system, to the base image system that comprises wireless means for selectively transmitting signals to and receiving signals from the charge coupled device image sensor;

setting the charge coupled device to the mode in which an image of an object can be recorded therein using the wireless means of both the charge coupled device image sensor and the base image system;

physically and electrically isolating the charge coupled device image sensor from the base image system after charge coupled device has been set in the mode in which an image can be recorded therein;

maintaining the image sensor in the mode previously set in for a useful period of time while the image sensor is physically and electrically isolated from the base image system;

placing the charge coupled device image sensor near an object of which it is desired to take an X-ray;

directing X-rays through the object and onto the charge coupled device image sensor to generate an electronic image of the object in the charge coupled device image sensor;

establishing via the wireless means of both the charge coupled device image sensor and the base image system an electrical coupling between the charge coupled device image sensor and the base image system so as to transfer the electronic image of the object from the charge coupled device image sensor to the base image system; and reading out an output signal from the base image system which corresponds to the image of the object.

9. A method of taking X-ray images of objects comprising the steps of:

configuring an X-ray system having a base image system with a detachable image sensor, such that the image sensor is capable of storing electronic images and the base image system is capable of performing interrogations of the detachable image sensor to read data stored thereon;

placing the image sensor, which comprises an image sensing device and means for setting the image sensing device in a record mode in which electrical representations of objects can be stored therein, in direct electrical contact with a base image system;

setting the image sensing device to the record mode;

detaching the image sensor from the base image system while the image sensor is in the record mode; so as to physically and electrically isolate the image sensor and the base image system;

maintaining the image sensor in the record mode previously set in for a predetermined period of time while the image sensor is physically and electrically isolated from the base image system;

placing the image sensing device near an object of which it is desired to take an X-ray;

directing X-rays through the object and onto the image sensing device to generate an electronic image the object in the charge coupled device;

placing the image sensor back into direct electrical contact with the base image system; and reading out an output signal from the base image sensor which corresponds to the image of the object.

10. A method of taking X-ray images of objects comprising the steps of:

configuring an X-ray system with a base image system having a detachable charge coupled device image sensor that is capable of storing electronic image data when placed into a record mode, and the base image system is capable of reading image data stored on the charge coupled device image sensor;

placing the charge coupled device image sensor in the record mode in which an image of an object can be recorded therein, and further placing the charge coupled device image sensor in direct electrical contact with the base image system;

removing the charged coupled device image sensor from the base image system after same has been placed in the record mode in which an image can be recorded therein so as to physically isolate the image sensor from the base image system;

maintaining the charge coupled device in the record mode previously set in for a useful period of time while the image sensor is physically and electrically isolated from the base image system;

placing the charge coupled device image sensor near an object of which it is desired to take an X-ray;

directing X-rays through the object and onto the charge coupled device to generate an electronic image of the object within the charge coupled device;

placing the charge coupled device image sensor back into direct electrical contact with the base image system; and reading out an output signal from the base image sensor which corresponds to the image of the object.

11. The method of claim 10 further comprising the step of flushing the charge coupled device of any charge carriers prior to placing it at one side of the object.

12. The method of claim 11 wherein the output signal is converted to a useful image within about one minute after the X-rays are directed thereon.

13. The method of claim 11 in which the charge coupled device is operated in a mode where holes are accumulated therein at room temperature so as to limit the formation of dark current.

14. The method of claim 13 further comprising the step converting the output signal to a visible image of the object.

15. A method of taking dental X-ray comprising the steps of:

configuring an X-ray system with a base image system that has a detachable charge coupled device image sensor, such that the charge coupled device image sensor is capable of storing electronic image data representing objects when placed into a record mode, and the base image system is capable of reading image data stored on the charge coupled device image sensor;

placing the charge coupled device image sensor in the record mode and further placing the charge coupled device image sensor in direct electrical contact with a base image system;

removing the charge coupled device image sensor from the base image system after the charge coupled device has been placed in the mode in which an image can be recorded therein so as to physically and electrically isolate the charge coupled device image sensor from the base image system;

maintaining the charge coupled device in the mode previously set in for a predetermined period of time while the image sensor is physically and electrically isolated from the base image system;

placing the charge-coupled device image sensor in the mouth of a person at one side of the teeth to be X-rayed;

directing X-rays into the mouth of the person, through the teeth, and onto the charge coupled device image sensor to generate an electronic image of the teeth in the charge coupled device;

removing the charge coupled device image sensor from the mouth of the person;

placing the charge coupled device image sensor back into direct electrical contact with the image system; and reading out an output signal from the base image sensor which corresponds to an image of the teeth.

16. The method of claim 15 further comprising the step of flushing the charge coupled device of any charge carriers prior to placing it in the mouth of the person.

17. The method of claim 15 wherein the charge-coupled device image sensor is removed from the mouth of the person and the output signal is read out within about one minute after the X-rays are directed onto the image sensor.

18. The method of claim 17 in which the charge coupled device is operated in a mode where the formation of dark current is limited.

19. The method of claim 18 in which the charge-coupled device is operated in a mode where holes are accumulated to limit the formation of dark current.

* * * * *